United States Patent Office 3,379,056
Patented Apr. 23, 1968

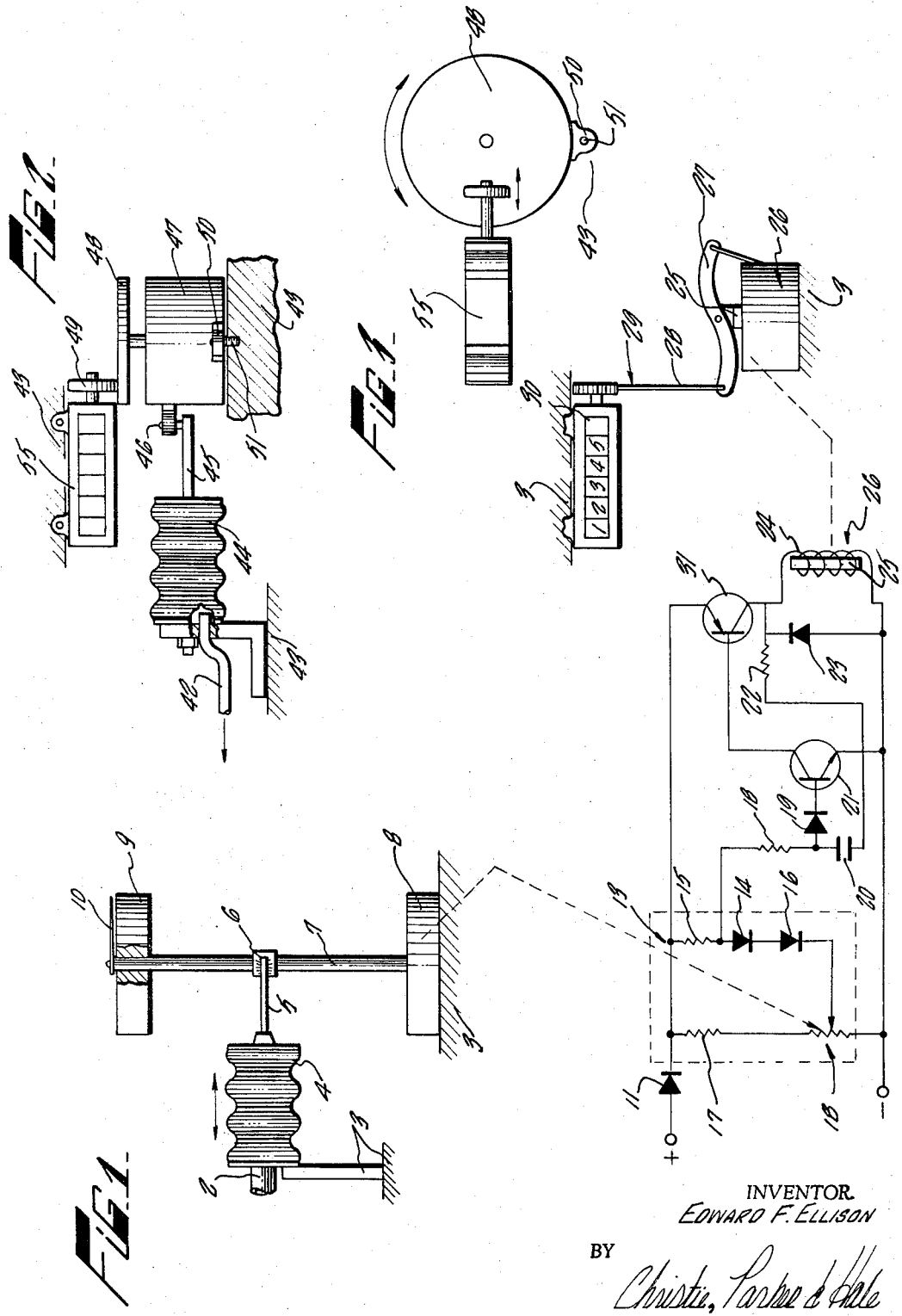

3,379,056
ENGINE WEAR METER
Edward F. Ellison, 2132 E. Chevy Chase Drive,
Glendale, Calif. 91206
Filed June 24, 1966, Ser. No. 560,153
10 Claims. (Cl. 73—115)

This invention relates to the art of engine instrumentation, and, more particularly, to an engine wear meter which measures engine wear as a function of both the time an engine has been in operation and the history of engine manifold pressure during this time.

It is well known that the amount of work produced by an internal combustion engine is directly related to its intake manifold pressure. Intake manifold pressure is produced by the induction of fuel and air into an engine's combustion chamber during the inlet portion of its cycle. Inasmuch as manifold pressure is a measure of pressure between the throttle and combustion chamber, throttle position directly affects its value. With an open throttle, manifold pressure will tend to be high (low vacuum), while at closed throttle the pressure will be low (relatively high vacuum). At closed throttle the engine is doing very little work despite the possibility that it is running at a relatively high speed. Conversely, with the throttle open, the engine may well be developing considerable work even at low values of revolution rate.

The amount of work over a period of time produced by an engine is a measure of the engine wear and hence an indication of the need for repair, tune-up, replacement or the like. Mileage and revolution totalization are, of course, indications of engine wear but have not proved sufficiently accurate as reliable indicators. Attempts have, therefore, been made to provide a more accurate measure of engine wear. One such attempt has been to measure the engine revolutions per unit of time together with a history of manifold pressure. This method integrates engine revolutions with manifold pressure in an effort to correlate engine wear. However, an engine may operate for considerable periods of time at a high revolution rate and with low manifold pressure without producing a great deal of work and, therefore, occasioning little wear. Conversely, an engine may run a great deal at a low revolution rate and high manifold pressure and experience a great deal of wear. Those systems which measure revolution rate and manifold pressure to combine the two into a measure of wear do indicate these variations of engine operating conditions to some extent; however, the measure is not very accurate. Moreover, the devices employed for such a measure are bulky, complicated and costly.

The instant invention overcomes the problems associated with prior art engine wear indicators by providing a simple, reliable and inexpensive engine wear meter which integrates the history of engine manifold pressure and operating time to yield a direct correlation of engine wear.

Briefly, the instant invention comprises an intake manifold pressure sensing device which continuously generates a pressure signal representative of the intake manifold pressure at any point in time. This signal is combined with a time signal to generate an output signal which is directly related to instantaneous manifold pressure multiplied by time. The output signal is then used to drive a totalizer. In other words, the instant invention contemplates the integration of manifold pressure with respect to time to generate an output signal which is applied to a counter. The counter continuously totalizes all the output signals to indicate the wear history of an engine.

In its preferred form, the invention employs a bellows which is responsive to engine manifold pressure. The bellows controls a potentiometer which in turn controls the frequency of an oscillator circuit. The oscillator controls a solenoid which drives a counter or totalizer by such means as a ratchet and pawl combination.

Another preferred embodiment of the instant invention utilizes a ball-disc integrator with manifold pressure and time as its inputs. A direct current timing motor drives a disc at a constant rate to supply the time input. A bellows responsive to manifold pressure determines the radial distance of the "ball" from the center of the disc and, thus, provides the manifold pressure input. The bellows is connected to the disc or the ball such that with increasing manifold pressure, which indicates that more work is being done by the engine, the ball moves radially relatively far from the center of the disc. When the engine is idling or under low load, the manifold pressure will decrease. The bellows is then connected, to move the ball radially towards the center of the disc at low engine loads. The ball drives a counter which continuously totalizes the time pressure input and gives the desired indication of engine wear.

The advantages of the instant invention include the provision of a wear meter which more accurately indicates engine wear when compared with prior art devices. By integrating time and manifold pressure to produce an output signal, the inaccuracies associated with engine revolution-manifold pressure systems are largely overcome. Viewed from one aspect, the instant invention provides a totalizer which continuously indicates time as influenced by manifold pressure. Inasmuch as revolution rate is not a variable used, the possibility of measuring high engine wear because of high revolution rate at low manifold pressure or the converse is not possible. In short, the elimination of revolution rate as a variable to be integrated provides a more realistic indication of engine wear.

These and other features, aspects and advantages of the instant invention will become more apparent from the following description, appended claims and drawings in which:

FIGURE 1 is a schematic view of the preferred apparatus of the instant invention;

FIGURE 2 is a schematic view of another preferred embodiment of the instant invention; and FIGURE 3 is a partial plan view of FIGURE 2.

Referring now to FIGURE 1 there is shown one of the preferred embodiments of the instant invention. Vacuum lead 2 is connected to the intake manifold of an internal combustion engine (not shown) and is in vacuum communication with the interior of bellows 4 which is secured at one end to frame 3. Link 5 is attached to the movable end of the bellows 4 and at its other end to sleeve 6. Shaft 7 is keyed in sleeve 6 and is rotatably coupled to a potentiometer 8 at one end and is attached at its other end to a pointer 10 which indicates manifold vacuum on a scale (not shown) on the upper surface of gauge 9. Both the gauge 9 and the potentiometer 8 are well-known in the art and, therefore, will not be described in detail. Movement of the bellows 4 in response to changes in manifold pressure of the internal combustion engine rotates shaft 7 through link 5 in the potentiometer 8 and moves the pointer 10 on gauge 9 to indicate manifold pressure.

The electrical portions of the embodiment shown in FIGURE 1 includes potentiometer 8 which is mechanically coupled in voltage divider circuit 13 to shaft 7. Voltage divider circuit 13 is connected in series to the positive terminal of a direct current (not shown) through circuit protection diode 11. The circuit protection diode 11 operates to block current flow in the event that the input polarity of the direct current power source is reversed. The voltage divider circuit 13 includes load resistor 17 which is connected in series through potentiometer 8 to ground; and a second load resistor 15, in parallel with the first load resistor 17, connected through temperature compensating diodes 14 and 16 to the leg of potentiometer 8 to ground. The temperature compensating diodes 14 and 16 draw current through resistor 15 and experience a slight voltage drop. This voltage drop will change with temperature and thus compensate and offset temperature induced voltage changes in the remaining portions of the circuit, for example, in blocking diode 19. Resistor 18 is connected between temperature compensating diode 14 and load resistor 15 through blocking diode 19 to the base of transistor 21. Blocking diode 19 serves to prevent the base of transistor 21 from experiencing a large negative signal. Capacitor 20 is also connected in series with resistor 18 as well as blocking diode 19 and the base of transistor 21. Current discharged by capacitor 20 is dissipated in resistor 18. Capacitor 20 is also connected through resistor 22 and coil 24 of solenoid 26 to ground. Transient suppression diode 23 is connected across the coil 24 of solenoid 26 to suppress negative voltage spikes caused by coil 24 when transistor 31 is not conducting. The collector of transistor 31 is connected in series with capacitor 20 through resistor 22 and to coil 24 to ground. The emitter of transistor 31 is connected to the positive terminal of the direct current power source through circuit protection diode 11. The base of transistor 31 is connected to the collector of transistor 21 while the latter's emitter is connected to ground.

Solenoid 26 has an armature 25 which actuates lever 27 which is pivotally mounted on the body of solenoid 26 at one end and connected to link 28 which in turn actuates a ratchet, and pawl mechanism 29 to drive the counter 30. The counter 30 as well as the ratchet and pawl mechanism 29 for its drive are well-known articles in the art and are not described in detail. Solenoid 26, potentiometer 8, and bellows 4 are connected to a frame 3 which is shown schematically.

The operation of the embodiment shown in FIGURE 1 is as follows:

The setting of potentiometer 8 is directly determined by the angular position of shaft 7 which in turn is a function of the pressure acting in bellows 4. The pressure in the bellows 4 is determined by the manifold pressure of the engine being monitored.

With a given setting in the potentiometer 8, the cyclic rate of the relaxation oscillator portion of the electrical system shown in FIGURE 1 is set. Initially, transistors 31 and 21 are not conducting. Transistor 31 begins to conduct upon the application of current through resistor 18 and blocking diode 19. The collector current of transistor 21 provides the base current for transistor 31 which then becomes conductive. The collector current of transistor 31 causes a positive signal to be applied to the base of transistor 21 by virtue of the coupling of such collector to the base of transistor 21 through resistor 22 and capacitor 20. The positive signal results in an increase in the respective collector current of transistor 21 and 31 until such transistors become saturated. Inasmuch as the saturation condition in transistors 21 and 31 is dependent on the charging current through capacitor 20, when capacitor 20 approaches a charged condition a negative signal is felt by the base of transistor 21 through resistor 22, capacitor 20 and blocking diode 19. The negative charge on capacitor 20 is removed by current flow through resistor 18 at a rate dependent on the setting of the potentiometer 8. When capacitor 20 is charged to a point where blocking diode 19 is forward biased, the oscillation cycle begins again.

When transistor 31 is conducting, current flows through coil 24 of solenoid 26 actuating armature 25 and lever 27 to drive counter 30. If the manifold pressure in the internal combustion engine is high, that is, when operating under load, the frequency of the relaxation oscillator is relatively fast and the counter 30 is progressed at a relatively rapid rate. When the intake manifold pressure felt by bellows 4 is low, the frequency of the relaxation oscillator is correspondingly small and the counter 30 advances at a slower rate.

Referring to FIGURES 2 and 3, there is shown an alternate embodiment of the instant invention. Intake manifold pressure line 42 is in vaccum communication with the interior of bellows 44 and the intake manifold of an internal combustion engine (not shown). The bellows 44 is fixed at one end to frame 43. The movable end of the bellows 44 is connected to link 45 which in turn is connected at 46 to timing motor 47. The timing motor 47 is preferably operable on direct current for compatibility with the electrical system of a vehicle. Timing motor 47 drives a disc 48 which in turn drives wheel or ball 49 of counter 55. Rotation of wheel 49 advances the indicators of counter 55. Timing motor 47 is pivotally mounted at its periphery to frame 43 through pin 51 journaled in journal 50, for positioning response to intake manifold pressure.

As the bellows 44 moves in and out in response to variations in intake manifold pressure of an internal combustion engine, the timing motor 47 will pivot about pin 51 increasing or diminishing the radial distance between the center of disc 48 and its line of contact with wheel or ball 49. Because the rate of rotation of wheel 49 is dependent upon the linear distance between it and the center of disc 48, the counter is controlled by the position of bellows 44, which in turn is a function of the pressure existing in the intake manifold of an internal combustion engine, as well as time. With high intake manifold pressure (low manifold vacuum), wheel or ball 49 will be radially distant from the center of disc 48 and drive counter 55 at a rapid rate. Conversely, with a low load on the monitored engine, there will be low manifold pressure (high vacuum) which will position wheel or ball 49 close to the center of disc 48 because of the concomitant contraction of bellows 44. When wheel or ball 49 is close to the center of the disc, the counter 55 will advance at a slow rate.

While the instant invention has been described with reference to certain preferred embodiments it will be understood by those skilled in the art that the spirit and scope of the appended claims should not be limited thereto. For example, a direct current timing motor can be connected by gearing to a counter. The speed of the timing motor is made dependent on voltage which in turn is controlled by a potentiometer coupled to an intake manifold pressure sensitive bellows. In addition, an alternating current timing motor controlled by a variable frequency power supply, the latter being proportional to manifold vacuum through a potentiometer connected to a bellows, may be employed.

What is claimed is:

1. A meter capable of indicating wear in an internal combustion engine having an intake manifold comprising:
   an intake manifold pressure sensing device responsive to the pressure in the intake manifold to generate a pressure signal;
   means independent of engine revolution rate cooperating with the pressure signal for generating an output signal representative of the pressure signal combined with time, such signal having a relatively high value with high manifold pressure and a relatively low value with low manifold pressure;
   a counter responsive to the output signal to indicate the cumulative total of such signals over a period of time.

2. The meter claimed in claim 1 wherein the output signal generating means includes means for generating a time signal independent of the engine's revolution rate, the time signal being combined with the pressure signal to produce the output signal.

3. The meter claimed in claim 2 wherein the time signal generating means includes an oscillator circuit.

4. The meter claimed in claim 3 wherein the oscillator circuit is of the relaxation type and including a potentiometer in circuit with the oscillator circuit and controlled by the pressure signal to vary the frequency of the oscillator and produce the output signal.

5. The meter claimed in claim 4 wherein the oscillator includes a transistor having a base, a collector and an emitter and a capacitor connected to the base, and including a solenoid having an armature to drive the counter, the coil of the solenoid being connected to the capacitor.

6. The meter claimed in claim 5 including a voltage divider circuit, the potentiometer being a part of such circuit, the base of the transistor being connected to the voltage divider circuit through a resistor, and a diode, the diode being between the base and the capacitor, a second transistor connected between the coil and the capacitor, a second diode connected across the coil, and a second transistor controlled by the first transistor and connected between the voltage divider circuit and the coil.

7. The meter claimed in claim 6 wherein the intake manifold pressure sensing device includes a bellows in pressure communication with the intake manifold, the bellows controlling the potentiometer and wherein the counter includes a ratchet driven by the armature.

8. The meter claimed in claim 2 wherein the time signal generator includes a constant speed timing motor.

9. The meter claimed in claim 8 including a disc rotatably driven by the timing motor, a wheel responsive to the rotation of the disc and coupled to the counter to drive its indicator, the wheel also being coupled to the pressure sensing device such that its rate of rotation is controlled by the pressure sensing device as well as the timing motor.

10. The meter claimed in claim 9, wherein the pressure sensing means includes a bellows in vacuum communication with the intake manifold and coupled to the wheel and disc such that the position of the wheel on the disc is varied with variations in manifold pressure.

References Cited
UNITED STATES PATENTS

| | | | |
|---|---|---|---|
| 1,414,910 | 5/1922 | Watson | 58—146 X |
| 2,159,236 | 5/1939 | Uher | 73—115 |
| 2,212,930 | 8/1940 | Cochrane | 58—146 |
| 2,645,118 | 7/1953 | Andresen | 73—115 |

RICHARD C. QUEISSER, *Primary Examiner.*

JAMES GILL, *Examiner.*

JERRY W. MYRACLE, *Assistant Examiner.*